United States Patent [19]
Ferrari et al.

[11] Patent Number: 5,664,898
[45] Date of Patent: Sep. 9, 1997

[54] LOCKING RING FOR ROTARY SHAFTS

[75] Inventors: Gino Ferrari; Franco Maioli, both of Correggio, Italy

[73] Assignee: Femas S.R.L., Reggio Emilia, Italy

[21] Appl. No.: 559,153

[22] Filed: Nov. 17, 1995

[30] Foreign Application Priority Data

Dec. 20, 1994 [IT] Italy ................................. RE94A0105

[51] Int. Cl.⁶ .................................................. F16B 21/02
[52] U.S. Cl. ........................... 403/37; 403/31; 403/34; 403/326
[58] Field of Search ................................ 403/31, 32, 34, 403/36, 37, 325, 326; 285/306, 309, 310

[56] References Cited

U.S. PATENT DOCUMENTS

| | | | |
|---|---|---|---|
| 3,179,450 | 4/1965 | Recker | 403/325 |
| 4,636,135 | 1/1987 | Bancon | 403/325 X |
| 5,467,619 | 11/1995 | Stillwagon et al. | 403/325 X |

FOREIGN PATENT DOCUMENTS

| | | | |
|---|---|---|---|
| 300399 | 4/1968 | Sweden | 285/308 |
| 1364821 | 1/1988 | U.S.S.R. | 285/306 |
| 2102522 | 2/1983 | United Kingdom | 285/310 |

*Primary Examiner*—Anthony Knight

[57] ABSTRACT

The locking ring includes a body having an axis and a hole along the axis. The body receives a shaft in the hole. The body includes a cavity, a first passageway communicating with the cavity, and a locking mechanism for releasably locking the body to a portion of the shaft disposed in the hole. The locking ring further includes a piston member having a piston head and a piston rod connected to the piston head. The piston head is disposed in the cavity, and the piston rod projects from the cavity in a direction parallel to the axis. The piston member moves relative to the body when pressure is supplied to the cavity via the first passageway.

13 Claims, 4 Drawing Sheets

LOCKING RING FOR ROTARY SHAFTS

BACKGROUND OF THE INVENTION

Machines for measurement, checking and manufacturing purposes are known to comprise a rotary shaft which rotates the object to be operated upon. This object is locked to the shaft by a ring mounted on the shaft to provide an axial thrust for locking the object, for example by pressing a cone or a flange (or itself acting as a cone or flange) against respective counteracting member, so as to clamp the object between the elements and secure it rigidly to the shaft.

An example of a machine of this type is a balancing machine for vehicle wheels.

Known locking rings all comprise on the inner surface of their hole a screw thread by which they are engaged on the shaft, which is also threaded.

Some known locking rings are of the quick-mounting type, ie they comprise one or more sectors which engage the shaft via their threaded surface, and can be shifted radially outwards for disengagement from the shaft so that the locking ring can be rapidly slid axially along the shaft into position.

All known locking rings are based on securing the ring to the shaft by applying a helical torque and then producing the axial thrust for locking the object by applying a suitable clamping torque to the ring.

Known locking rings have the drawback of being necessarily provided with radial levers of a length which is greater the greater the torque to be obtained, in order to be able to apply the necessary clamping torque manually. However, as the shaft rotates at generally very high speed and as the levers project outwards beyond the ring, such levers represent a danger to operator safety.

A further drawback is that as the clamping torque is applied manually, it is not of constant value. Sometimes an excessive torque is applied, with resultant excessive stressing of the thread, and consequent considerable effort required to release the locking ring, with the risk that, for many types of quick-mounting rings, the locking action on the object may fail.

SUMMARY OF THE INVENTION

An object of the invention is to provide a locking ring which obviates the aforesaid drawbacks.

According to the present invention the ring body is divided into two component parts movable axially relative to each other, of which a first component part comprises means for axially securing it to the shaft and the second component part is arranged to act axially to lock the object; one of the component parts comprises an inner cavity whereas the other comprises an axially slidable piston portion contained within this inner cavity; between the piston portion and the inner cavity there being defined a variable-volume closed thrust chamber, the increase in volume of which determines the axial movement of the second component part in the direction of the axial thrust for object locking. The thrust chamber comprises a compressed air inlet with unidirectional value means which prevent the air leaving the chamber, and means which, when operated, discharge the air from the thrust chamber. The axial thrust produced by the air in the thrust chamber provides the required thrust for locking the object.

BRIEF DESCRIPTION OF THE DRAWINGS

The invention is described in detail with the aid of the accompanying figures, which illustrates two embodiments thereof.

DETAILED DESCRIPTION OF THE PREFERRED EMBODIMENTS

Figure 1:
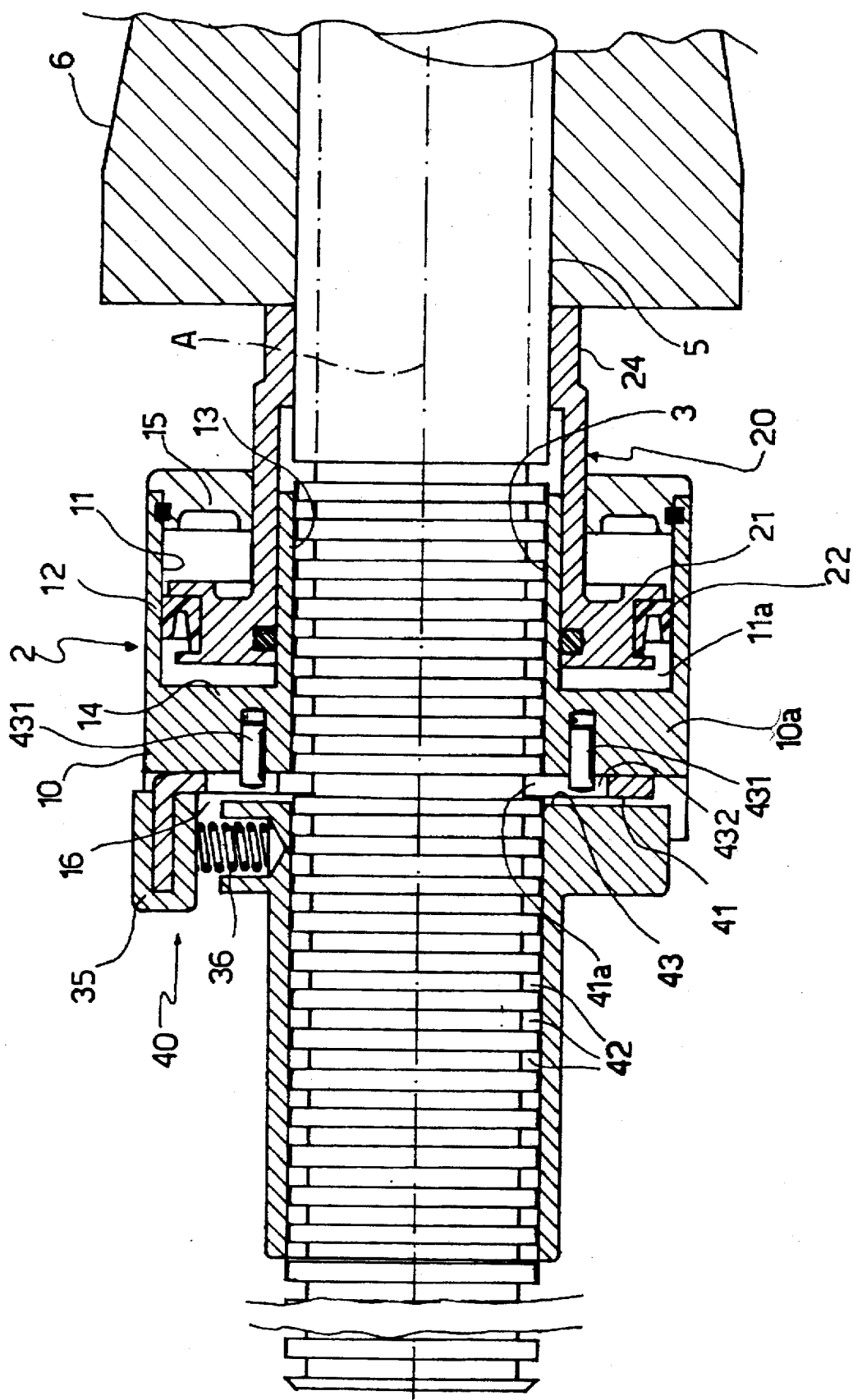
FIG. 1 is an axial section through a first embodiment of the locking ring applied to a respective rotary shaft.

Referring to FIG. 1, the locking ring of the invention includes an overall approximately cylindrical body 2 with an axial hole 3 through which there is inserted the rotary shaft 5 on which the object (not shown) to be operated upon is to be locked.

The body 2 consists of a first component part 10 and a second component part 20, which can move axially relative to each other and each comprising the axial hole 3.

The first component part 10 comprises a securing device indicated overall by 40 (described in detail hereinafter) for securing it axially to the shaft 5. The second component part 20 is instead free to move axially and is arranged to push against a rear locking body 6 (cone or flange) which clamps the object to be locked against a counteracting body (not shown but of any known type).

The first component part 10 includes a rear cylindrical portion 10a containing a toroidally extending inner cavity 11 of constant cross-section coaxial with the shaft 5. The cavity 11 is defined by an outer cylindrical wall 12 and an inner cylindrical wall 13, and has an axis which coincides with the axis A of the shaft 5. The cavity 11 is bounded at its rear by a radial wall 14.

The second component part 20 includes a piston portion 21 defines a piston axially slidable under sealed conditions within the cavity 11. The piston portion 21 is of toroidal shape corresponding to that of the cavity 11, is of constant cross-section and is slidable as an exact fit between the cylindrical walls 12 and 13 rearward of the radial wall 14.

Gaskets 22 and 23 fitted to the piston portion 21 provide a hermetic seal.

Figure 2:
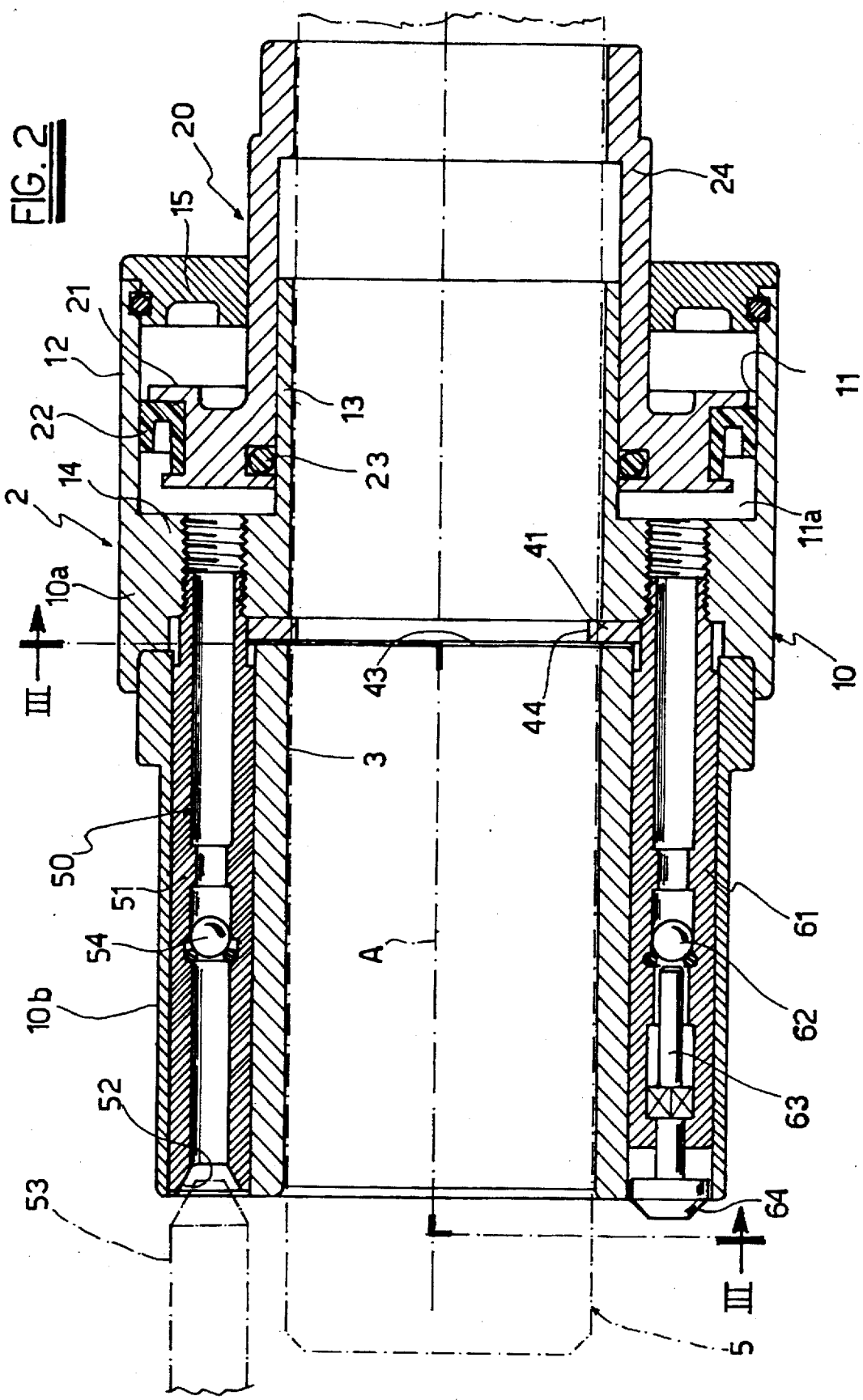
FIG. 2 is an axial section through the ring of FIG. 1 on a plane perpendicular to that of FIG. 1.
Figure 3:
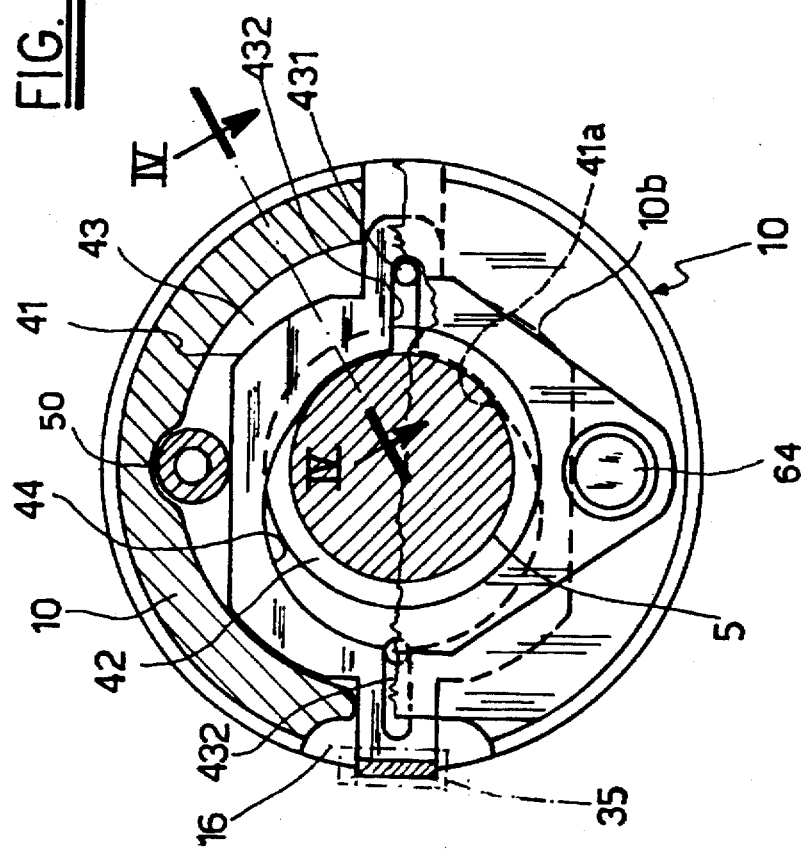
FIG. 3 is a section on the plane III—III of FIG. 2.

As an alternative to the illustrated arrangements of FIG. 2, and achieving the same effect, the piston portion 21 can be formed on the first component part 10 and the cavity 11 can be formed in the component part 20.

Between the piston portion 21 and the cavity 11 there is defined a variable-volume thrust chamber 11a (portion of the cavity 11), the increase in volume of which causes the second component part 20 to move axially in the direction of the object locking thrust to be provided by the locking ring.

To the rear of the chamber 11a there is a radial wall 15 joined to the outer wall 12 to limit the maximum travel of the piston portion 21.

As shown in FIG. 2, the thrust chamber 11a has a compressed air inlet 50. The inlet 50 consists of an axial conduit 51 inserted into the front portion 10b of the component part 10 and communicating with the chamber 11a via the radial wall 14. Its outer mouth 52 is shaped (in particular is inwardly converging) to mate with a nozzle 53 of an external device for feeding compressed air, for example the nozzle of a compressed air delivery gun connected to a usual compressed air feed line present in many workshops and laboratories.

In the conduit 51 there is provided a unidirectional valve 54 which allows free entry of compressed air into the chamber 11a but prevents its exit.

On the other side of the axis A there is a second axial conduit 61, for air exit from the chamber 11a.

The conduit 61 is also inserted into the portion 10b and comprises a unidirectional valve 62 similar to the valve 54, to normally prevent air exit. Along the outer portion of the conduit 61 there is provided a thin rod 63 with a pushbutton 64 projecting outwards from the component part 10. The rod 63 is normally urged outwards by a spring, in which position it does not act on the valve 62. On finger-pushing the rod 63 inwards, it removes the valve 62 from its seat to allow the air to escape from the chamber 11a through the conduit 61.

The securing device 40 generally includes at least one element 41 for axially engaging the shaft 5 and able to be disengaged from the shaft 5 by being manually shifted radially, the shaft 5 comprising a series of transverse grooves distributed axially along its cylindrical surface and each able to receive the engagement element 41.

Figure 4:
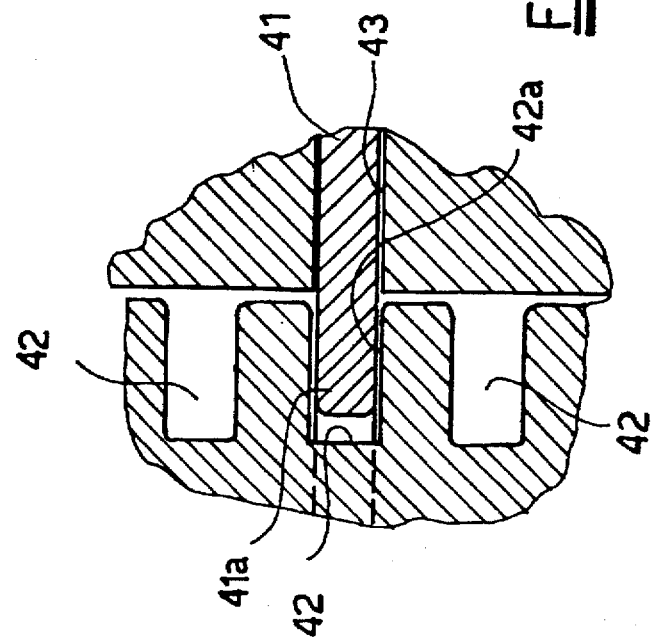
FIG. 4 is a section on the plane IV—IV of FIG. 3 to an enlarged scale.

In the illustrated embodiment (FIGS. 1–4) the grooves 42 in the shaft 5, each extend in a respective plane perpendicular to the axis A, and are distributed axially along the shaft 5. As shown in FIG. 4, the counteracting walls 42a of the grooves 42 act on the engagement element 41 which are perpendicular to the axis A or undercut.

The engagement element 41 is in the form of a plate radially movable within a narrow radial seat 43 which is provided within the first component part 10 perpendicular to the axis A and which intersects the hole 3. The seat 43 restrains the element 41 such that the engagement element can move only in a radial direction, by virtue of two pins 431 fixed to the component part 10 and inserted through two radial slots 432 provided in the element 41 (see FIGS. 1 and 3). The element 41 possesses a profiled hole 44 through which the shaft 5 passes. The edge 41a of the element 41 is able to engage any grooves 42 in the vicinity of a region of the hole 44.

The engagement element 41 can be moved radially between two limiting position, namely a first position in which the edge 41a projects inwards of the surface of the axial hole 3 to hence engage a groove 42 (FIG. 4), and a second position in which the edge 41a does not project (neither does the remaining part of the element 41) and engage a groove 42.

A spring 36 normally maintains the engagement element 41 in said first position. To move it into the second position, the engagement element 41 possesses a pusher 35 accessible from the outside, by which the engagement element 41 can be pushed manually into the second position against the action of the spring 36.

Advantageously, the pusher 35 is housed within a seat 16 provided on the outer surface of the component part 10 so as substantially not to project radially from the cylindrical surface of the portion 11b, representing the maximum diameter surface of the locking ring.

Although the illustrated grooves 42 extend as a complete circumference, they and the edge 41 could be of different extension. For example the grooves 42 could extend only along one or more circumferential arcs of the shaft 5. The cross-section of the shaft 5 could also be different from the circular shape shown, at least along that portion involving the locking ring.

In use, to rapidly place the locking ring in position the pusher 35 is pressed manually to move the element 41 into the second position. The ring can then be slid freely (and rapidly) along the shaft 5 until its second component part 20 lies against the locking body 6. The pusher 35 is then released with the result that the element 41 is urged into its first position in which its edge 41a engages in a groove 42. By means of the nozzle 53 compressed air is then fed into the chamber 11a so that this latter urges the second component part 20 against the locking body 6 with a determined force representing the locking forced produced by the ring.

In the meantime the first component part 10 is kept at rest by the action of the element 41 against the wall 42a, and as this action is perpendicular to the axial thrust (or indeed is in undercut), there are no force components acting in a radial direction, hence ensuring stability of the positioning of the engagement element 41 within the groove 42.

To release the locked state it is necessary merely to press the pushbutton 64 to remove pressure from the chamber 11a.

Figure 5:
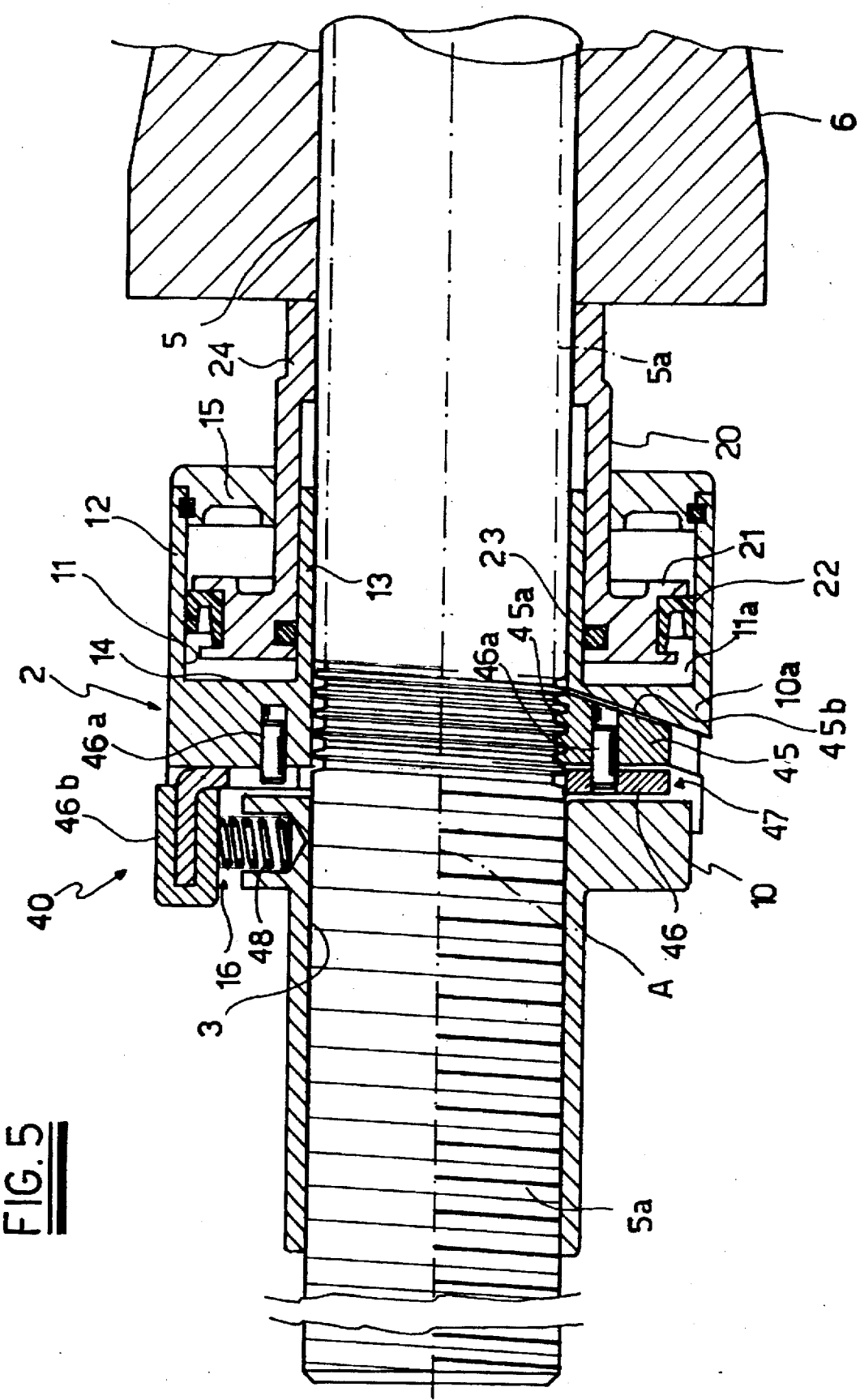
FIG. 5 is a section through a second embodiment of the invention, the section corresponding to that of FIG. 2.

The embodiment illustrated in FIG. 5 differs from the preceding only with regard to the securing device 40.

These can be of any type, such as those used in the known quick-mounting locking rings.

The securing device 40 illustrated in FIG. 5 are of the type illustrated in patent application RE93U000026 filed on April 15 by the present applicant.

In this case the surface of the shaft 5 along which the locking ring moves is provided with a thread 5a. The securing element consists of a block 45 fixed by an axial pin 46a to an annular plate 46 provided with an external pusher 46b.

The block 45 and the plate 46 are movable radially within a corresponding radial seat 47 provided within the first component part 10 perpendicular to the axis A and intersecting the axial hole 3. The seat 47 restrains the plate 46 and block 45 such that these can be moved only in a radial direction. The block 45 has a surface 45a, facing the surface of the shaft 5, threaded such that its thread can engage in the thread 5a of the shaft 5. The plate 46 is provided with a central hole through which the shaft 5 passes but never contacts.

The block 45 can be moved radially between a limiting position in which its surface 45a engages the thread 5a and a second limiting position in which the surface 45a does not project from the surface of the hole 3.

A spring 48 maintains the plate 46 and the block 45 normally in the first position. To move them into the second position the pusher 46b is pressed downwards.

Advantageously (but this is not essential), the block 45 has its rear lateral surface 45b inclined to the axis A by an angle equal to or less than the inclination of the side of the thread 5a in the axial plane. The corresponding surface of the seat 47 faced by the surface 45a has an equal angle of inclination. As explained in the cited prior patent application, these characteristics eliminate the danger that, because of the inclination of the sides of the thread 5a, the block 45 may withdraw radially and disengage from the thread 5a by virtue of the radial components of the thrust which act on the block.

This embodiment is used in the same manner as the preceding.

Because of the fact that the locking thrust provided by the locking ring is not obtained by rotating it manually about the axis A, and more generally because of the fact that it is never necessary to rotate the ring, it is apparent that the locking ring can be of substantially cylindrical external shape, and be free from levers or other radially projecting elements for its rotation.

Moreover as the locking thrust is provided by the pressure of the air fed into the chamber 11a, it can be easily arranged for this chamber to be always raised to a given same pressure which provides the required locking thrust. In this manner the locking thrust obtained is the same for every operation.

We claim:

1. A locking ring, comprising a body having an axis and a hole along said axis, said body receiving a shaft in said hole, said body including, a cavity, a first passageway communicating with said cavity, and locking means for releasably locking said body to a portion of said shaft disposed in said hole; and a piston member having a piston head and a piston rod connected to said piston head, said piston head disposed in said cavity and said piston rod projecting from said cavity in a direction parallel to said axis, said piston member moving relative to said body when pressure is supplied to said cavity via said first passageway.

2. The locking ring of claim 1, wherein said body is a cylindrical member.

3. The locking ring of claim 1, wherein said cavity is a toroidal space with constant cross section coaxial with said axis.

4. The locking ring of claim 3, wherein said piston head and said piston rod are toroids with constant cross section.

5. The locking ring of claim 1, wherein said piston head and said piston rod are toroids with constant cross section.

6. The locking ring of claim 1, wherein said piston head separates said cavity into a first and second area, said first area communicating with said first passageway such that as pressure is supplied to said first area via said first passageway, said piston head moves in a direction parallel to said axis causing an increase in volume of said first area and a corresponding decrease in volume of said second area.

7. The locking ring of claim 1, wherein said first passageway has a first end opening to said cavity and a second end shaped to mate with a nozzle of a pressure supplying device.

8. The locking ring of claim 1, further comprising:

a second passageway communicating with said cavity, said second passageway including means for selectively allowing pressure to exhaust from said cavity via said second passageway.

9. The locking ring of claim 8 wherein said first passageway includes means for allowing pressure to be supplied to said cavity via said first passageway and prevents pressure from exhausting from said cavity via said first passageway.

10. The locking ring of claim 1, wherein said body is freely movable along said shaft when said locking means releases said body from said shaft.

11. The locking ring of claim 1, wherein said locking means locks said body to said shaft such that said body rotates with said shaft when said shaft rotates.

12. The locking ring of claim 1, wherein said locking means comprises:

an engagement element movable in a direction perpendicular to said axis, said engagement element being received between grooves in said shaft when said locking means locks said body to said shaft.

13. The locking ring of claim 12, wherein said grooves in said shaft lie in planes perpendicular to said axis and walls of said grooves are one of perpendicular to said axis and undercut; and said engagement is movable between a first and second limiting position, said engagement element does not extend into said hole in said first limiting position, and extends into said hole in said second limiting position.

* * * * *